Feb. 14, 1961 M. D. RUST 2,971,315
MOISTENING ASSEMBLY FOR COTTON PICKING SPINDLE
Filed Jan. 30, 1959 7 Sheets-Sheet 1
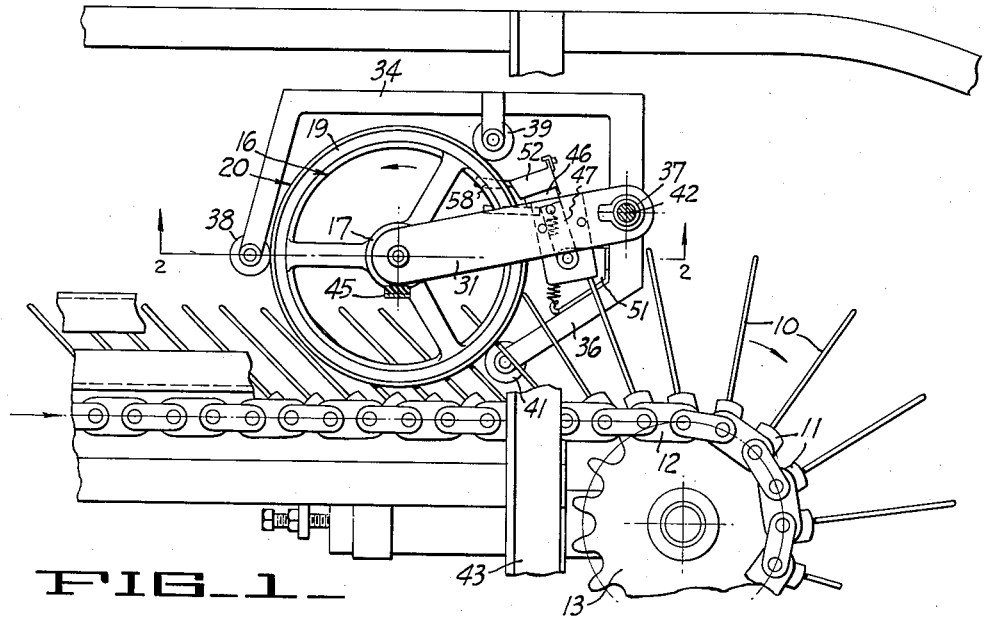
FIG_1_
FIG_2_
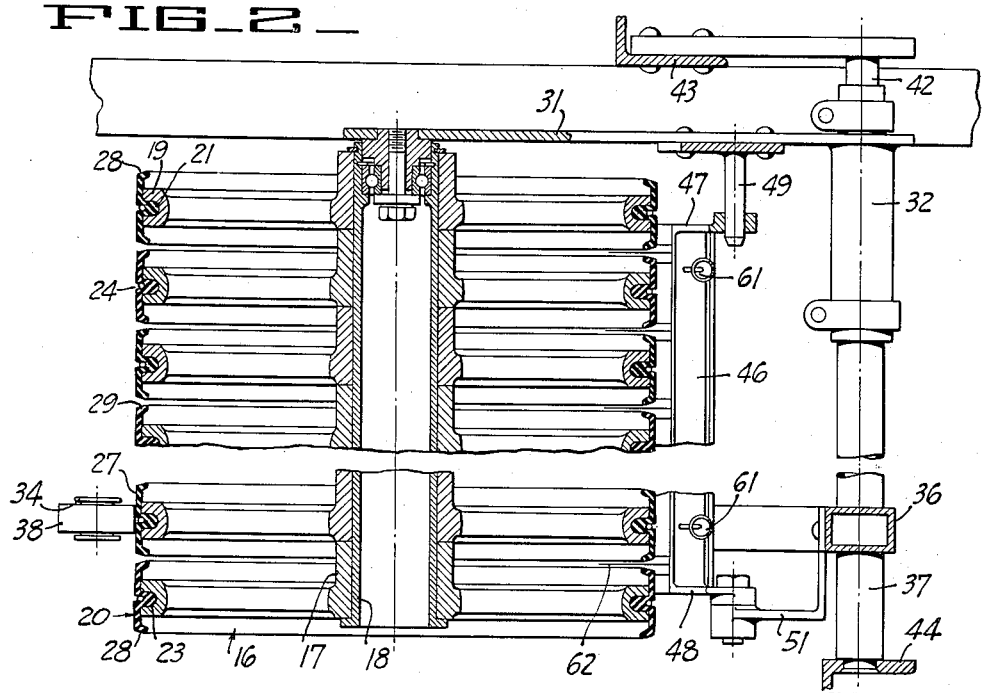
INVENTOR.
Mack D. Rust
BY
ATTORNEYS

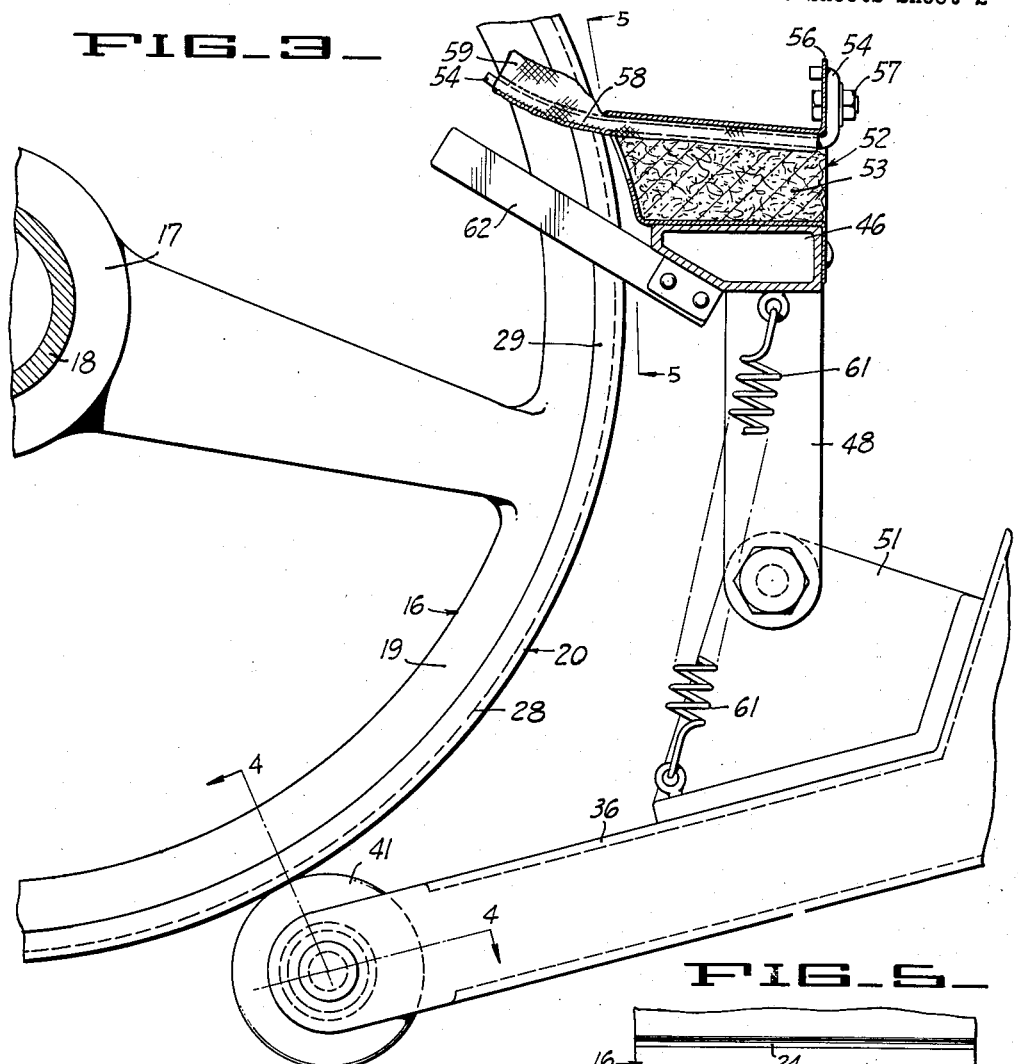
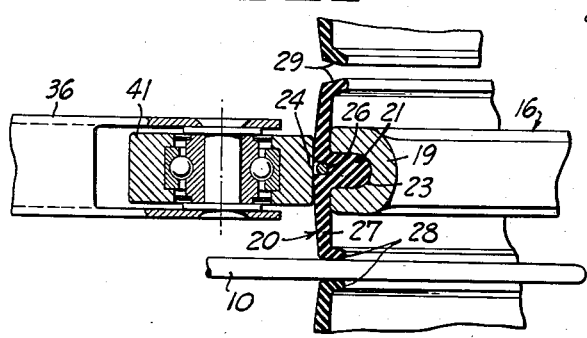
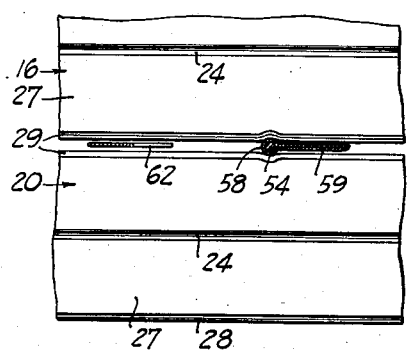

Feb. 14, 1961 M. D. RUST 2,971,315
MOISTENING ASSEMBLY FOR COTTON PICKING SPINDLE
Filed Jan. 30, 1959 7 Sheets-Sheet 3
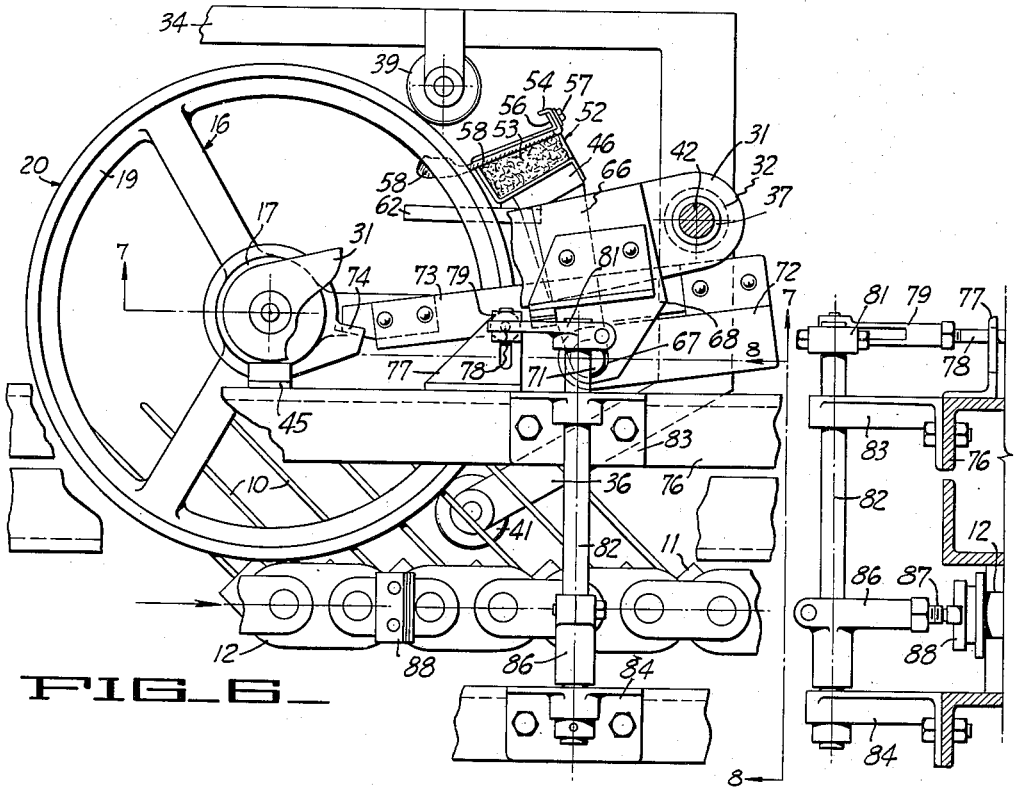
FIG_6_
FIG_8_
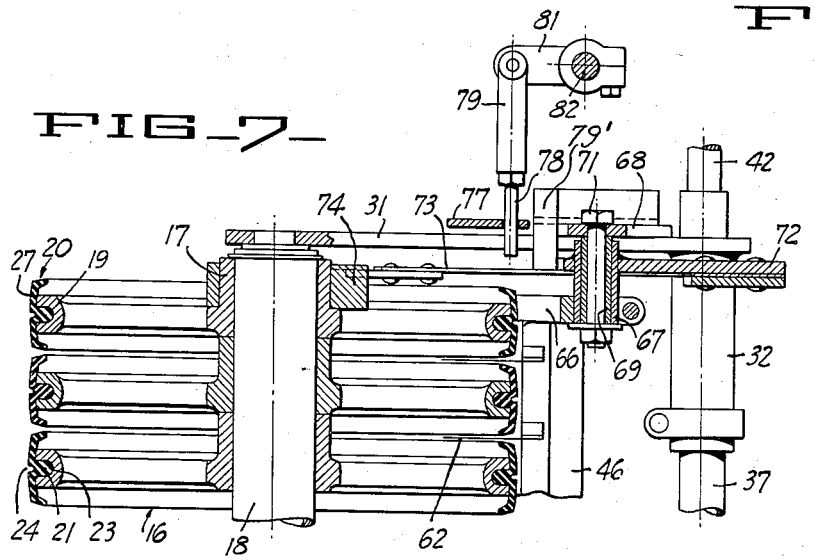
FIG_7_
INVENTOR.
Mack D. Rust
BY
ATTORNEYS

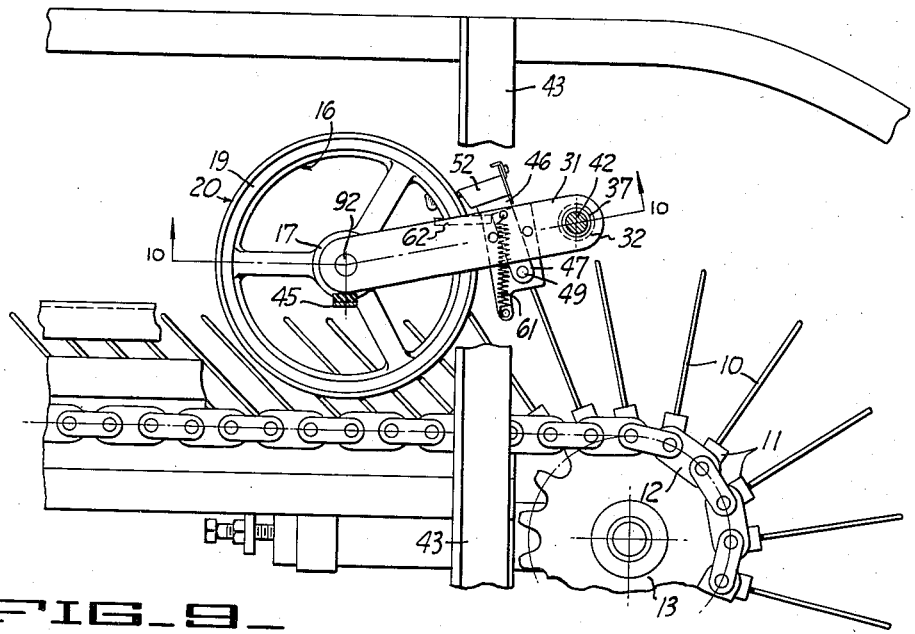
FIG_9_
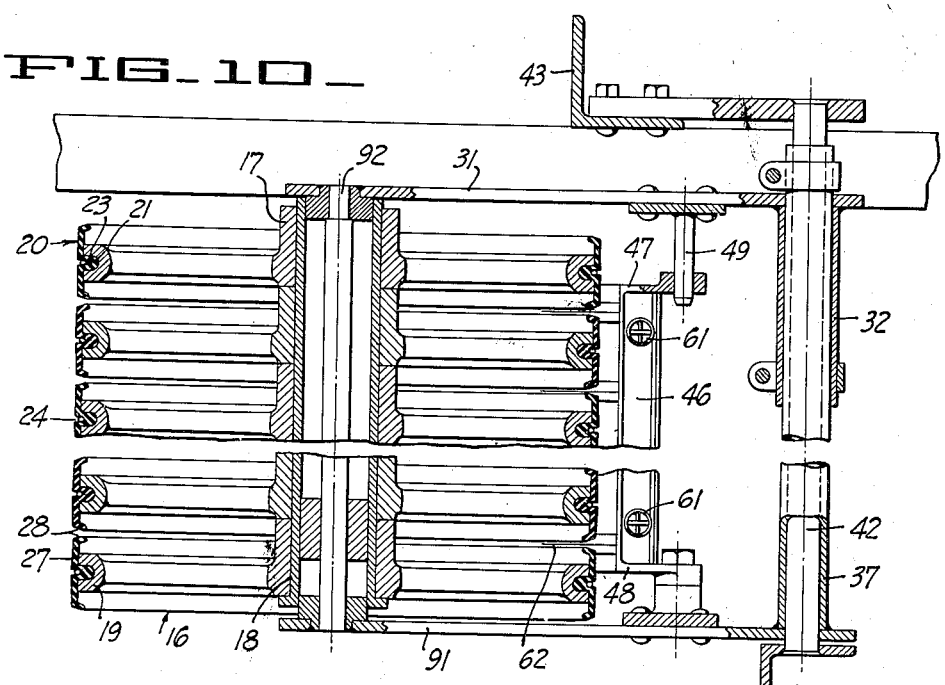
FIG_10_

Feb. 14, 1961 M. D. RUST 2,971,315
MOISTENING ASSEMBLY FOR COTTON PICKING SPINDLE
Filed Jan. 30, 1959 7 Sheets-Sheet 5
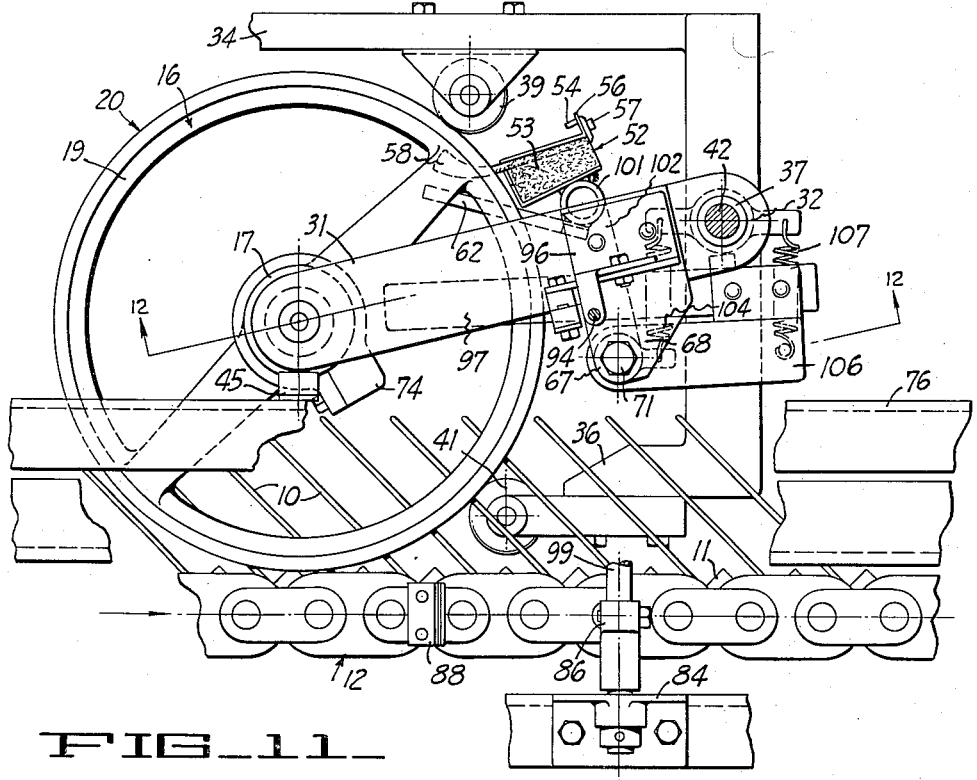
FIG_11_
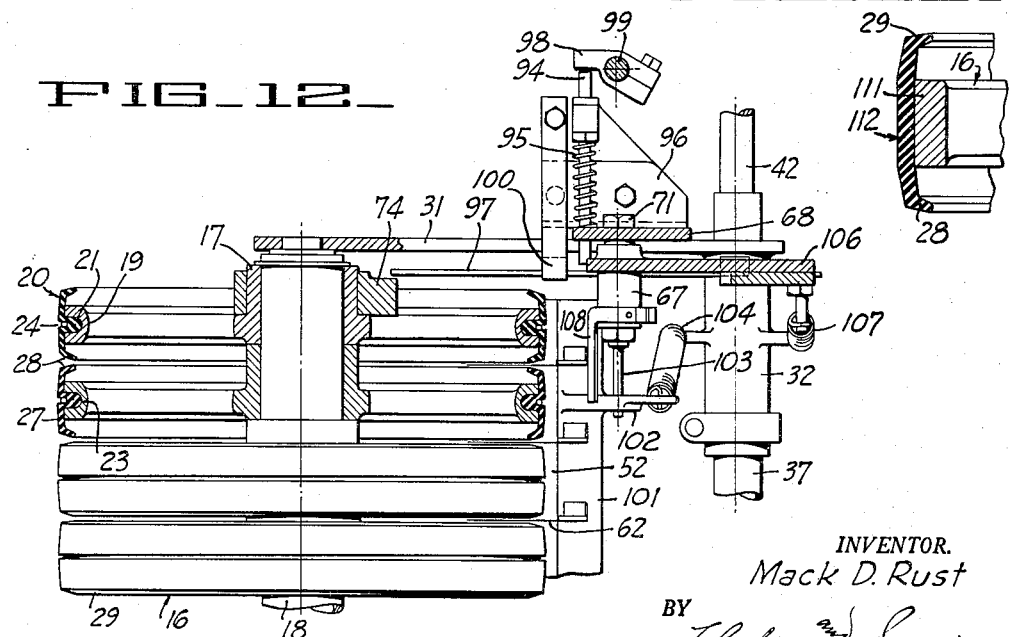
FIG_12_  FIG_13_
INVENTOR.
Mack D. Rust
BY
ATTORNEYS Feb. 14, 1961 M. D. RUST 2,971,315
MOISTENING ASSEMBLY FOR COTTON PICKING SPINDLE
Filed Jan. 30, 1959 7 Sheets-Sheet 6
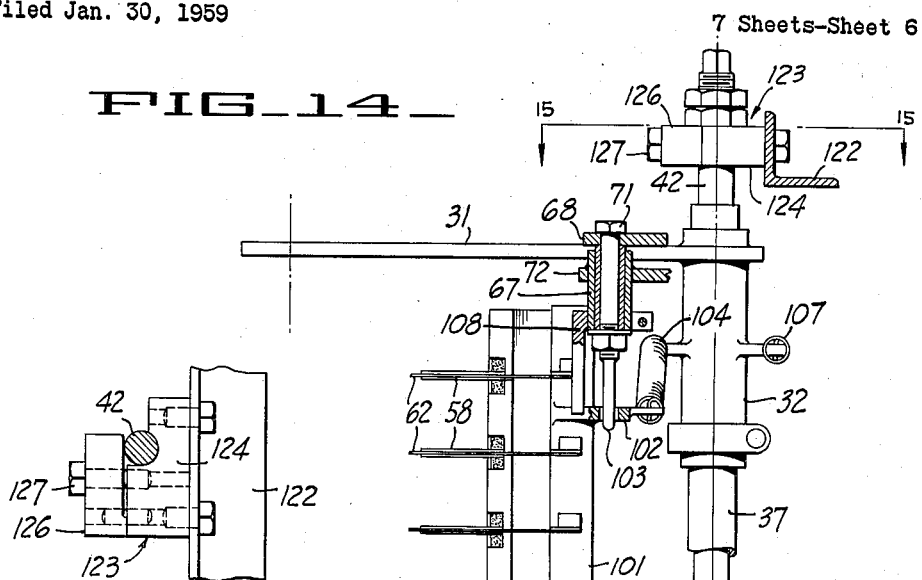
FIG_14_
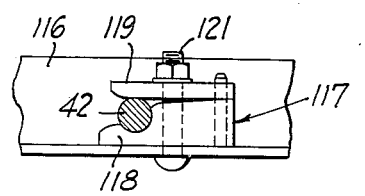
FIG_15_
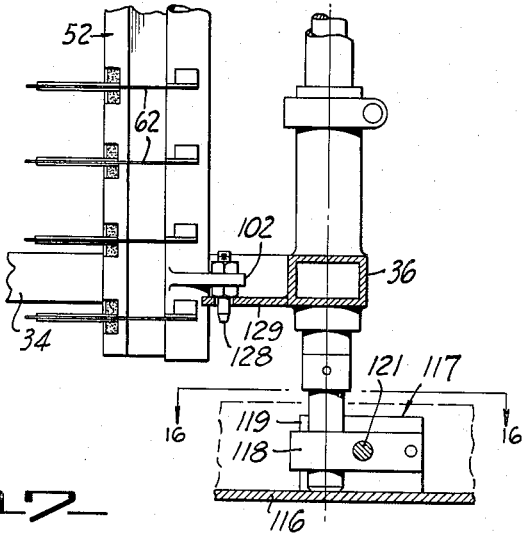
FIG_16_
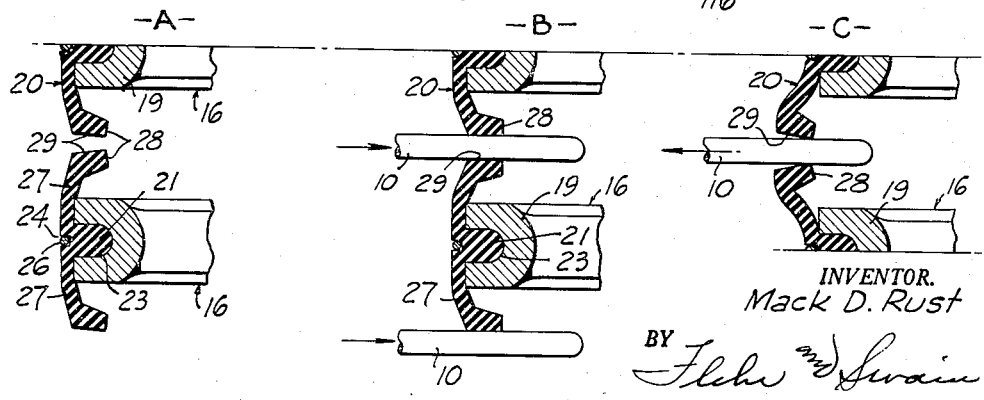
FIG_17_
INVENTOR.
Mack D. Rust
BY
ATTORNEYS Feb. 14, 1961　　　M. D. RUST　　　2,971,315
MOISTENING ASSEMBLY FOR COTTON PICKING SPINDLE
Filed Jan. 30, 1959　　　　　　　　　　　　7 Sheets-Sheet 7
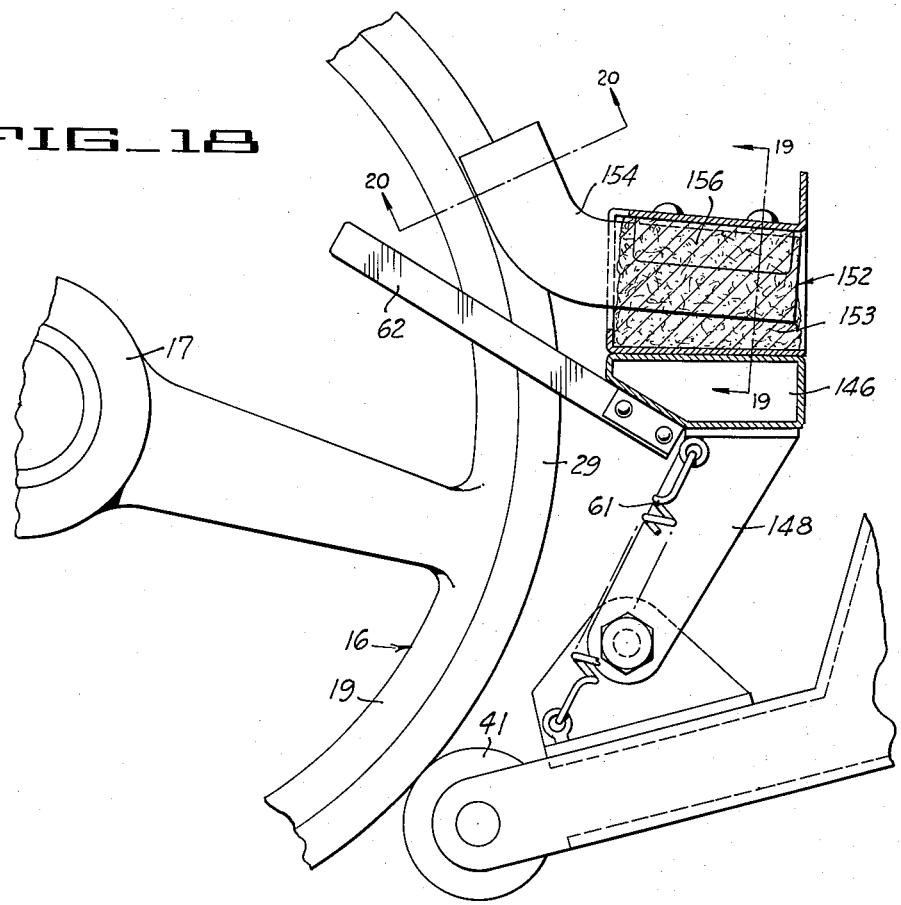
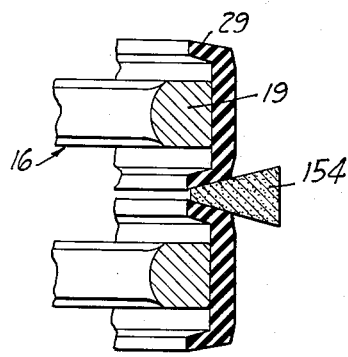
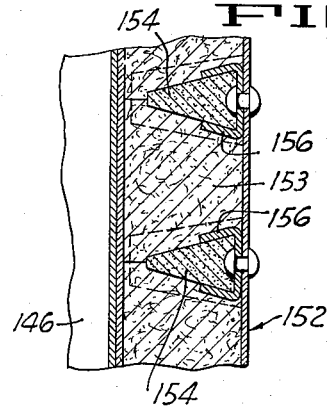
INVENTOR.
Mack D. Rust
BY
ATTORNEYS United States Patent Office 2,971,315
Patented Feb. 14, 1961

2,971,315
MOISTENING ASSEMBLY FOR COTTON PICKING SPINDLE

Mack D. Rust, Coalinga, Calif.

Filed Jan. 30, 1959, Ser. No. 790,229

10 Claims. (Cl. 56—42)

This application relates generally to machines for the field picking of cotton.

One type of cotton picking machine being used commercially employs a large number of picking spindles rotatably carried by slats, which in turn are carried by endless chains. The cycle of operation is such that the spindles progress through a station where moisture is applied to their outer surfaces, after which the spindles are thrust into plants while being rotated whereby fiber is contacted and wound upon the spindles. Thereafter the spindles are retracted from the plants and passed through a stripping station for removal of the fiber. The moistening operation is an important part of this complete cycle, particularly because the proper application of a suitable amount of moisture to the spindles contributes to the overall performance and picking efficiency of the machine. A spindle that is improperly moistened may fail to wind up fiber due to insufficient moisture to cause initial adherence of the fiber to the surface of the spindle. Too much moisture is likewise objectionable because it adds excessive and detrimental amounts of water to the picked cotton and contributes to erratic and unsatisfactory performance generally of the picking machine.

One type of moistening means which has been used in the past employs stationary means with which the spindles are brought into contact, and which serves to apply surface moisture. Moisteners of this type are unsatisfactory particularly because it is difficult to maintain operation with optimum application of moisture to the spindles. In other words there is a tendency for too much or too little moisture to be applied, and such equipment presents a difficult maintenance problem for continued field operations with a minimum amount of shutdown time.

Another type of moistening device has been proposed which employs wheels assembled on a vertical axis, and provided with rim portions made of rubber or like resilient material. The wheels are arranged whereby the spindles are drawn between the opposed resilient side faces of the rims. Wet sponges are disposed to wipe upon the outer peripheries of the rims, the intent being that the moisture so applied will be transferred to the surfaces of the spindles. This type of rotary moistener has been unsatisfactory for several reasons. The method employed for wetting the rims of the wheels does not result in satisfactory transfer of moisture to the spindles. There is a tendency toward clogging which necessitates frequent shutdown of the machine for cleaning. Clogging is caused mainly by accumulation of cotton fiber within the wheels and particularly in the lower part of the wheel assembly. It may be explained in this connection that although the stripping means may be reasonably effective some small amount of fiber inevitably remains upon the spindles, and some of this fiber is removed by and tends to accumulate in the moistening apparatus. Therefore with this type of moistening device removal of residual fiber is a detriment which impairs its effectiveness. A further disadvantage of this type of equipment (as previously constructed) is that it is difficult to service and to make field repairs. It is also subject to bending or breakage of wheels or other parts due to passage of foreign objects occasionally caught and carried past the moistening station.

In general it is an object of the present invention to improve upon cotton picking machines, particularly with respect to the means employed for the moistening operation.

Another object of the invention is to provide a cotton picking machine having efficient moistening means which also serves effectively to remove remaining cotton fiber, without causing clogging.

Another object of the invention is to provide a cotton picking machine having improved moistening means of the rotary type, and in which moisture is more effectively and uniformly applied to the cotton picking spindles for optimum picking efficiency.

Another object of the invention is to provide a cotton picking machine having a moistener of the rotary type in which means is provided for the disposal of removed fiber.

Another object of the invention is to provide a cotton picking machine of the above character in which the moistening means is provided with a fiber stripping means operated at recurrent intervals to dispose of accumulated fiber.

Another object of the invention is to provide a moistener which employs a wheel assembly capable of being moved to an out of the way position with respect to the normal path of movement of the picking spindles, thus facilitating field maintenance and repair and serving to prevent damage to wheels or other parts due to passage of foreign objects.

Another object of the invention is to provide an improved moistening wheel construction which more effectively applies a desired amount of moisture to the spindles, and which also effectively removes any remaining cotton fiber.

Further objects and features of the invention will appear from the following description in which the preferred embodiment of the invention has been set forth in detail in conjunction with the accompanying drawing.

Referring to the drawing:

Figure 1 is a plan view illustrating a portion of a cotton picking machine, and in particular showing a moistening means in accordance with the present invention.

Figure 2 is a cross sectional view taken along the line 2—2 of Figure 1.

Figure 3 is an enlarged detail view showing the stripping fingers and the moisture applying means, some of the parts being shown in section.

Figure 4 is a cross sectional detail taken along the line 4—4 of Figure 3.

Figure 5 is an enlarged cross sectional detail taken along the lines 5—5 of Figure 3.

Figure 6 is a view similar to view Figure 1 but on an enlarged scale, and showing certain parts broken away, with other parts in section.

Figure 7 is a view taken along the sectional line 7—7 of Figure 6.

Figure 8 is a detail view taken along the sectional line 8—8 of Figure 6.

Figure 9 is a plan view like Figure 1, but showing another embodiment.

Figure 10 is a cross sectional view taken along the line 10—10 of Figure 9 and on an enlarged scale.

Figure 11 is a view like Figure 6, but showing another embodiment.

Figure 12 is a cross sectional view taken along the line 12—12 of Figure 11.

Figure 13 is a cross sectional detail showing a modified type of moistening wheel.

Figure 14 is an elevational view in section illustrating the embodiment of Figures 11 and 12 together with means for maintaining the entire assembly.

Figure 15 is a cross sectional detail taken along the line 15—15 of Figure 14.

Figure 16 is a cross sectional detail taken along the line 16—16 of Figure 14.

Figure 17 is an elevational view with parts broken away and shown in section.

Figure 18 is a cross sectional detail similar to Figure 3, but showing another embodiment.

Figures 19 and 20 are cross-sectional details taken along the lines 19—19 and 20—20 respectively of Figure 18.

Figure 1 illustrates a portion of a cotton picking unit, such as is incorporated in a machine of the type disclosed in Patent Nos. 1,894,198, 2,058,514, 2,085,046, 2,466,969, and 2,699,638. The picking spindles 10 are in the form of cylindrical shaped metal rods, rotatably journaled in bearings carried by the slats 11. The slats in turn have their upper and lower ends attached to the carrying chains 12, which engage sprockets 13 at the forward and rear ends of the picking unit. The spindles carried by each slat are evenly spaced in a vertical direction. When the machine is in operation the sprockets 13 rotate continuously and the chains carry the spindles and slats through the various operating stations. Assuming that moisture has been applied to the spindles, they are thrust into plants upon which the machine is operating with rotation of the spindles whereby when they contact exposed cotton fiber, the fiber is wound upon the spindles and picked from the bolls. Then the spindles retract from the plants and pass through a stripping station where the wound fiber is stripped lengthwise from the spindles. Thereafter the spindles pass through a moistening station where moisture is applied. Figure 1 shows the spindles passing through the moistening station where moistening means is provided in accordance with the present invention.

The moistening means shown in Figures 1 and 2 consists of a plurality of wheels 16 which are assembled to rotate about a common vertical axis. While the details of construction may vary, in this instance each wheel includes a hub 17 which is assembled upon the hollow tubular shaft 18. The metal portion 19 of the wheel rim carries an annulus 20 formed of suitable resilient material, such as natural or synthetic resilient rubber. The particular type of rubber annulus illustrated in Figure 4 is T-shaped in section, with its portion 21 seated in a groove 23 formed in the metal rim portion 19. A circumferential slot 24 formed in portion 21 serves to accommodate the tie cord or wire 26, by means of which the annulus is firmly attached to the wheel. Resilient and deformable rim portions 27 extend laterally from the sides of the wheel, and are provided with flange portions 28 that provide spindle contacting side faces 29. As will be presently explained these side faces receive moisture and serve to apply moisture to the surfaces of the spindles. The spacing between adjacent opposed side faces 29 is substantially less than the diameter of the spindles, whereby when a spindle is drawn between these faces, the flanges 28 are somewhat deformed in the manner shown in the lower portion of Figure 4, to bring the faces 29 into frictional contact with substantial areas of the spindles. Note that opposed side faces 29 are convergent in a direction toward the axis of the wheel assembly. This construction is advantageous as will be presently explained.

As means for supporting the wheel assembly in operating position, I provide a frame including the upper arm 31 (Figure 1) which has its one end attached to the sleeve 32, and its other end journaled to the upper end of the tubular shaft 18. Adjacent the lower end of the wheel assembly I provide arms 34 and 36 (Figure 1) which are secured to a sleeve 37. These arms carry rollers 38, 39 and 41 (Figure 1) which engage the outer periphery of one of the lower wheels of the assembly, as for example the next to the lowest wheel as shown in Figure 2. It will be noted that rollers 38, 39 and 41 engage the rim of a wheel at circumferentially spaced points whereby the lower end of the wheel assembly is retained to rotate about the desired vertical axis. Sleeves 32 and 37 are fixed with respect to each other and are rotatably carried by a vertical shaft 42, the latter being mounted on portions 43 and 44 that are carried by the main frame of the machine. The construction just described permits the wheel assembly to remain in the normal operating position shown in Figure 1, in which it is in the path of movement of the picking spindles. When it is desired to make repairs, the wheel assembly together with the frame formed by arm 31 and arms 34 and 36 is swung outwardly about the axis of the support shaft 42, to a position in which it is not engaged by the spindles. It may be explained at this point that the axis of shaft 42 is spaced from the slat carrying chains 12 a distance that is somewhat greater than the normal spacing between the chains and the axis of shaft 18. Thus the force required to draw the spindles between the wheels for the direction of spindle movement shown in Figure 1, produces a force component tending to urge the wheel assembly toward the chains and the spindle carrying slats. Suitable stop means 45 can be provided to limit and maintain a desired optimum spaced relationship between the wheel assembly and the slats.

Means is provided for effectively applying moisture to the side faces 29 whereby such moisture is efficiently transferred to the picking spindles. This means consists of a vertically extending mounting member 46 which is carried by the upper and lower arms 47 and 48. Arm 47 is shown journaled upon a pin 49, which is mounted upon the arm 31, and arm 48 is shown pivotally attached to a bracket 51, which is attached to the lower frame arm 36. The mounting member 46 carries a container 52 formed of suitable material such as sheet metal, and which is filled with a water absorbent material, such as ordinary sponge fiber 53 (Figure 3). At the upper end of the container 52, suitable means such as a water reservoir (not shown) provided with an adjustable drip valve, can be employed for applying water to the sponge at a controlled even rate.

Suitable fingers 54, which may be made of spring wire, are shown being carried by the container 52 in such a manner as to extend between the rims of the wheels. In the particular construction illustrated, bent ends of the fingers 54 are removably secured to a flange 56 in the container 52, by means such as bolts 57. A material such as soft cotton cloth or cotton wicking 58 is wrapped about (i.e. folded over) the projecting ends of the fingers 54 and also extends into the container 52 whereby it is adequately wet by the sponge 53. Preferably the wicking provides a trailing edge 59 which aids the surface wetting of the side faces 29.

A tension spring 61 normally urges the mounting member 46, together with the fingers 54, toward the normal operating position shown in Figure 3. However, the mounting member 46 can be swung to the right as shown in Figure 3 past the dead center position of spring 61, thereby retracting the fingers from the wheels.

In addition to the moistening means I provide means for removing cotton fiber that may be removed from the spindles and which tends to cling to the rims of the wheels. Thus I provide a plurality of vertically spaced stripping fingers 62 which can be in the form of relatively thin flat bars having a thickness less than the spacing between adjacent side faces 29 of the rubber annuluses. It is convenient and desirable to mount these rods directly upon the mounting member 46. Therefore when the moistening fingers are retracted, the stripping fingers 62 are likewise retracted from the rims of the wheels. The length of the stripping fingers 62 preferably is such that they complete their retraction subsequent to retraction of the moistening fingers, thus preventing fiber being stripped from the fingers 62 from engaging and being caught by the moistening fingers. Likewise when the moistening fingers are returned from retracted to operating position of the same, the stripping fingers 62 first enter between the rims of the wheels, thus removing any accumulations of fiber before entry of the moistening fingers.

The machine described above operates as follows: Assuming that the spindles are entering the moistening station after fiber has been removed from the same, their paths of movement are aligned with the spaces between the rims of the wheels, and therefore the spindles are drawn between the side faces 29 in the manner illustrated in Figures 1 and 17. As a spindle enters between opposed side faces 29, some deformation of the resilient material occurs as shown at B in Figure 17 with the result that in the regions of engagement the flanges 28 tend to flatten out and thus provide a relatively large area of contact between side faces 29 and the surfaces of the spindle. Frictional engagement between the side faces 29 and the spindles causes the wheel assembly to rotate about its vertical axis, whereby the wheels rotate relative to the moistening fingers 54. As a result moisture is continuously applied to the side faces 29, and moisture is uniformly and effectively applied to the surfaces of the picking spindles. Withdrawal of a spindle is shown at C in Figure 17, and is accompanied by a shifting of the area of engagement to the inner edges of the surfaces 29. As previously mentioned some small amount of fiber remains upon the spindles from the preceding stripping operation. Such fiber is effectively removed when the spindles pass between and are then withdrawn from the moistening wheels, and tends to adhere to the rims of the wheels on or in the vicinity of the faces 29. The stripping fingers 62 effectively remove such adhering fiber from the rims of the wheels, and such removed fiber either remains upon the inner ends of the fingers 62, or drops through the lower end of the wheel assembly. It will be noted in this connection that the construction described leaves the lower end of the wheel assembly completely open and unobstructed by any lower supporting arm corresponding to the upper arm 31. Therefore fiber may drop through the wheel assembly without accumulating in such a manner as to cause clogging. Occasionally the operator may manually retract the moistening fingers 54 together with the stripping fingers 62, by swinging the mounting member 46 outwardly. This serves to strip off any fiber that may tend to cling upon the inner ends of the fingers 62.

Previous reference has been made to the fact that with the construction described the wheel assembly can be swung outwardly from the path of movement of the spindles, to facilitate making repairs. In addition this feature provides for free floating action whereby the wheel assembly may over-ride any foreign objects, such as sticks, chunks or the like, being carried by the slats or spindles, and which might otherwise injure the wheels or other parts of the machine. In other words the wheel assembly is free to swing outwardly a limited amount relative to the slats and thereafter automatically return again to a normal operating position.

Figures 6 and 7 illustrate a modification in which means is provided for automatically retracting the moistening and stripping fingers, and returning them to normal operating positions. The mounting member 46 for the moisture applying means in this instance is carried by the arms 66, the upper arm of which is carried by the sleeve 67. The corresponding lower arm is suitably pivotally attached to the arm 36, as in the manner illustrated in Figure 3. The arm 31 to which the wheel assembly is journaled carries a plate 68 to which the sleeve 69 is attached. Bolt 71 extends downwardly through the sleeve 69 and serves to retain sleeve 67, whereby the sleeve 67 together with arm 66 may swing about a vertical axis. An arm 72 is attached to sleeve 67, and serves to carry a spring arm 73, having its free end adapted to be moved vertically into the path of movement of a cam lug 74, that is fixed to the hub 17 of the uppermost wheel 16. A portion 76 of the main frame of the machine carries a bracket 77 which is adapted to accommodate the release pin 78. This pin is carried at the lower end of a link 79, which in turn is carried by the arm 81 on the horizontal shaft 82. The shaft is journaled to the brackets 83 and 84 (Figure 8), which in turn are carried by portions of the main machine frame. A strike arm 86 is attached to shaft 82, and an adjustable tip such as may be formed by the set screw 87, extends into the path of movement of a lug 88 attached to the slat carrying chain 12. When arm 73 is depressed it is initially engaged beneath the latch 79' and thereby held in position for engagement with cam lug 74, independently of the return of pin 78. Figure 7 shows the arm 73 engaged by latch 79'.

Operation of the embodiment shown in Figures 6-8 is as follows: Normally the parts are in the operating positions shown in Figure 6. At recurrent intervals, depending upon the number of lugs 88 which are provided, the shaft 82 is rocked to cause the pin 78 to dislodge the spring arm 73 downwardly. This causes the free end of this arm to be moved into engagement beneath latch 79' and brought into the path of movement of the cam lug 74, with the result that arm 73 together with the mounting member 46 and the moistening and stripping fingers attached to the same, are moved to retracted positions with respect to the wheels, and thereafter permitted to return to their normal positions. Suitable spring means (not shown), is applied to the mounting member 46 to urge the same toward normal operating position, whereby it automatically returns to this position after the lug 74 passes the arm 73.

In some instances it may be desirable to omit the retaining rollers 38, 39 and 41 incorporated in the preceeding embodiments, and use instead a conventional shaft bearing at the lower end of the wheel assembly. Such a modification is shown in Figures 9 and 10. In this instance, an arm 91, similar to the upper arm 31, is attached to the lower end of sleeve 37. The free end of this arm is attached to the lower end of shaft 92, extending between the arms 31 and 91. Suitable upper bearing means is provided between the tubular shaft 18 and the stationary shaft 92.

Figures 11 and 12 illustrate another embodiment of the invention in which means is provided for automatically moving the moistening and stripping fingers between normal operating and retracted positions. In this instance the bracket 96 is mounted upon arm 31, and carries the vertically slidable release pin 94, which is urged upwardly by the compression spring 95. The spring arm 97 is adapted to be engaged by the lower end of pin 94, and moved downwardlly to bring its free end into operative engagement with the cam lug 74. The upper end of pin 94 is engaged by the finger 98 on shaft 99, this shaft corresponding to the shaft 82 of Figure 6. The arm 86 on shaft 99 is adapted to be engaged by the lug 88 on the slat carrying chain 12. Latch 100 corresponds with latch 79' of Figure 7 and functions in the same manner.

The embodiment of Figures 11 and 12 further differs from Figures 6 and 7 in that the tubular mounting member 101 is provided, in place of the mounting member 46. The arms 102, corresponding to arms 66 of Figure 6, are likewise modified as to form, and as in the previous embodiments serve to pivotally carry the mounting 101 together with the moisture applying fingers and the stripping fingers, for movements between their operating and retracted positions.

The lower end of bolt 71 is extended to form a pin 103 upon which the upper arm 102 is pivoted. The lower arm can be provided with a similar pivotal connection, whereby the assembly including the mounting 101 can be readily removed or applied. Tension spring 104 yieldably urges the mounting and moistening means toward the wheels. The arm 106 is carried by sleeve 67 and in turn carries the spring arm 97. Arm 106 is urged in a counter clockwise direction by spring 107. A finger 108 is attached to sleeve 67, and extends to engage and rotate arm 102 and mounting 101 when arm 97 is rotated by cam 74. This provides a lost motion connection which employs the tension of spring 104 to return the moistening means to operating position.

While it is desirable to secure the resilient rubber to the rims of the wheels in the manner illustrated in Figure 4, the simpler arrangement illustrated in Figure 13 can be employed. In this instance the metal portions 111 of the wheels provide flat cylindrical faces to which the medial portion of the resilient rubber annulus 112 is securely bonded. Such bonding is desirable because it prevents any possible separation of the resilient material from the metal, which permits foreign material to enter and thus interfere with the desired form of the rims.

Figures 14–16 illustrate novel means for mounting the shaft 42 whereby the entire moistening assembly, including the wheels may be quickly removed. The lower end of the shaft 42 is secured to a frame member 116 of the machine by a clamp 117. The clamp (Figure 16) may consist of a block 118 notched to receive the shaft, and a clamp plate 119 held in place by the clamping bolt 121. The upper end of shaft 42 is secured to the frame member 122 by the clamp 123. The latter (Figure 15) can consist of a notched block 124 together with the clamping plate 126 and screw 127.

Figure 14 also shows the pivotal connection for the lower end of mounting 101. The lower arm 102 carries a pivot pin 128 which engages an aperture in the support arm 129.

It will be evident that the arrangement shown in Figures 14–16 greatly facilitates repairs and servicing of the machine under field conditions.

In the modification of Figures 18–20, the general arrangement is similar to Figure 3. The vertical mounting member 146 (corresponding to member 46 of Figure 3) is carried by upper and lower arms 148. These arms are pivotally mounted as in Figure 3. Member 146 carries a container 152 which is filled with sponge fiber 153. Means as described in connection with Figure 3 serves to supply water to the sponge at a controlled rate. Moisture applying members 154, formed of water absorbent material, are carried by the retainers 156. One end of each member 154 is within the container 152, and the other projecting end portion is wedge shaped (Figure 20) and disposed to engage the opposed faces 29 of two adjacent wheels. These members 154 can be made of various materials, such as synthetic sponge material, with or without an inner metal or plastic stiffener or reinforcement, or cotton cloth or webbing applied over a rubber or plastic core.

This application is a continuation-in-part of my copending application Serial No. 618,881, filed October 29, 1956, and now abandoned, for "Moistening Assembly for Cotton Picking Spindles."

I claim:

1. In a cotton picking machine of the type having a frame and spindles movably mounted thereon for movement along a fixed path; means for applying moisture to the spindles comprising an assembly mounted on said frame adjacent said path and including a plurality of vertically spaced wheels rotatable about means defining a common vertical axis, the periphery of each wheel having resilient material thereon providing deformable spindle-engaging side faces, the side faces of adjacent wheels being vertically spaced to permit spindles moving along said path to be drawn between the same, said spacing being normally less than the diameter of the spindles whereby the spindles frictionally engage and deform said side faces and rotate said wheels, said assembly being mounted on said frame for swinging movement about a fixed axis spaced from said common axis whereby said assembly is mounted on said frame for movement from a normal position in which the peripheries of said wheels are adjacent said path to a displaced position outwardly of said path.

2. A machine as defined in claim 1 including stop means on said frame, engageable with said assembly, to limit the movement thereof in a direction toward said fixed path.

3. A machine as defined in claim 1 wherein said means defining said common axis is supported on said assembly solely from the upper end thereof, and retention means on said assembly engaging the periphery of at least one of said wheels at the lower end of said plurality of wheels at circumferentially spaced points for holding said common axis in vertical orientation.

4. A machine as defined in claim 1, wherein said spindle-engaging side faces are defined by resilient flanges, adjacent spaced flanges being inwardly convergent toward said common axis.

5. In a cotton picking machine of the type having a frame and spindles movably mounted thereon for movement along a fixed path; means for applying moisture to the spindles comprising an assembly mounted on said frame adjacent said path and including a plurality of vertically spaced wheels rotatable about means defining a common vertical axis, the periphery of each wheel having resilient material thereon providing deformable spindle-engaging side faces, the side faces of adjacent wheels being vertically spaced to permit spindles moving along said path to be drawn between the same, said spacing being normally less than the diameter of the spindles whereby the spindles frictionally engage and deform said side faces and rotate said wheels, and moisture-applying members carried by said assembly and extending between adjacent opposed faces whereby to apply moisture directly to said side faces.

6. A cotton picking machine as defined in claim 5 together with means including elongated fiber-dislodging members extending between said opposed side faces to dislodge the fibers therefrom.

7. A machine as defined in claim 6 wherein said fiber-dislodging members extend inwardly between said wheels in a direction sloping rearwardly of the direction of movement of said side faces.

8. A machine as defined in claim 6 together with means mounting said fiber-dislodging members on said assembly for movement generally radially of said wheels whereby they may be withdrawn outwardly from between said side faces to strip accumulated fibers therefrom.

9. A machine as defined in claim 8 including means thereon for periodically retracting said fiber-dislodging members from between said side faces.

10. A machine as in claim 8 including means thereon for periodically retracting said fiber-dislodging members from between said side faces in timed relation to rotation of said wheels.

References Cited in the file of this patent

UNITED STATES PATENTS

| | | |
|---|---|---|
| 2,023,491 | Rust et al. | Dec. 10, 1935 |
| 2,485,845 | Rust | Oct. 25, 1949 |
| 2,525,184 | Rust | Oct. 10, 1950 |
| 2,567,301 | Rust | Sept. 11, 1951 |